United States Patent [19]
Isoe et al.

[11] Patent Number: 5,671,019
[45] Date of Patent: Sep. 23, 1997

[54] CHARACTER INFORMATION DISPLAY APPARATUS FOR A PARTIAL AND A FULL-SCREEN DISPLAY

[75] Inventors: Youichi Isoe; Tatsuo Morishita, both of Saitama-ken, Japan

[73] Assignee: Kabushiki Kaisha Toshiba, Kanagawa-ken, Japan

[21] Appl. No.: 363,229

[22] Filed: Dec. 23, 1994

[30] Foreign Application Priority Data

Dec. 24, 1993 [JP] Japan ................................ 5-328909

[51] Int. Cl.⁶ .................................................. H04N 5/445
[52] U.S. Cl. .......................... 348/565; 348/563; 348/468
[58] Field of Search ....................................... 348/468, 565, 348/461, 563, 564, 566, 567, 568, 569, 570; 358/183, 147; H04N 7/08, 7/087, 5/44, 5/445, 5/45, 5/50

[56] References Cited

U.S. PATENT DOCUMENTS

| | | |
|---|---|---|
| 4,725,888 | 2/1988 | Hakamada . |
| 5,128,766 | 7/1992 | Choi .......................................... 348/565 |
| 5,285,284 | 2/1994 | Takashima et al. ..................... 348/565 |
| 5,327,176 | 7/1994 | Forler et al. . |
| 5,453,796 | 9/1995 | Duffield et al. ......................... 348/565 |
| 5,512,954 | 4/1996 | Shintani .................................. 348/468 |

FOREIGN PATENT DOCUMENTS

| | | | |
|---|---|---|---|
| 2080887 | 4/1993 | Canada .................... | H04N 7/08 |
| 2734196 | 2/1979 | Germany . | |
| 0034618 | 3/1979 | Japan ....................... | 358/183 |
| 0034283 | 4/1981 | Japan ....................... | 358/147 |
| 0217085 | 8/1990 | Japan ....................... | H04N 7/08 |
| 6128451 | 8/1993 | Japan . | |

OTHER PUBLICATIONS

Patent Abstracts of Japan, Publication No. JP5056369, vol. 17, No. 371, Jul. 1993.
Patent Abstracrs of Japan, Publication No. JP62073881, vol. 11, No. 275, May 1987.
Patent Abstracts of Japan, Publication No. JP6046350, vol. 18, No. 275, May 1994.
Patent Abstracts of Japan, Publication No. JP6062340, vol. 18, No. 308, Jun. 1994.

*Primary Examiner*—David E. Harvey
*Attorney, Agent, or Firm*—Cushman, Darby & Cushmun IP Group of Pillsbury Madison & Sutro LLP

[57] ABSTRACT

A display apparatus for displaying a partial-screen image within a full-screen image includes a change-over switch for exchanging the video signals for the full-screen and partial-screen displays. When only the full-screen image is displayed, character information corresponding to the full-screen image can be turned on or off. When both the full-screen image and the partial-screen image are displayed, a cyclic operation can be performed under control of a controller. The cycle includes: 1) turning on the display of character information corresponding to the full-screen image, 2) turning on the display of character information corresponding to the partial-screen image, and 3) turning off the display of character information. The display apparatus is also capable of turning on the display of character information corresponding to the full-screen image when a mute of sound is turned on and turning off the display of character information when the mute of sound is subsequently turned off.

5 Claims, 4 Drawing Sheets

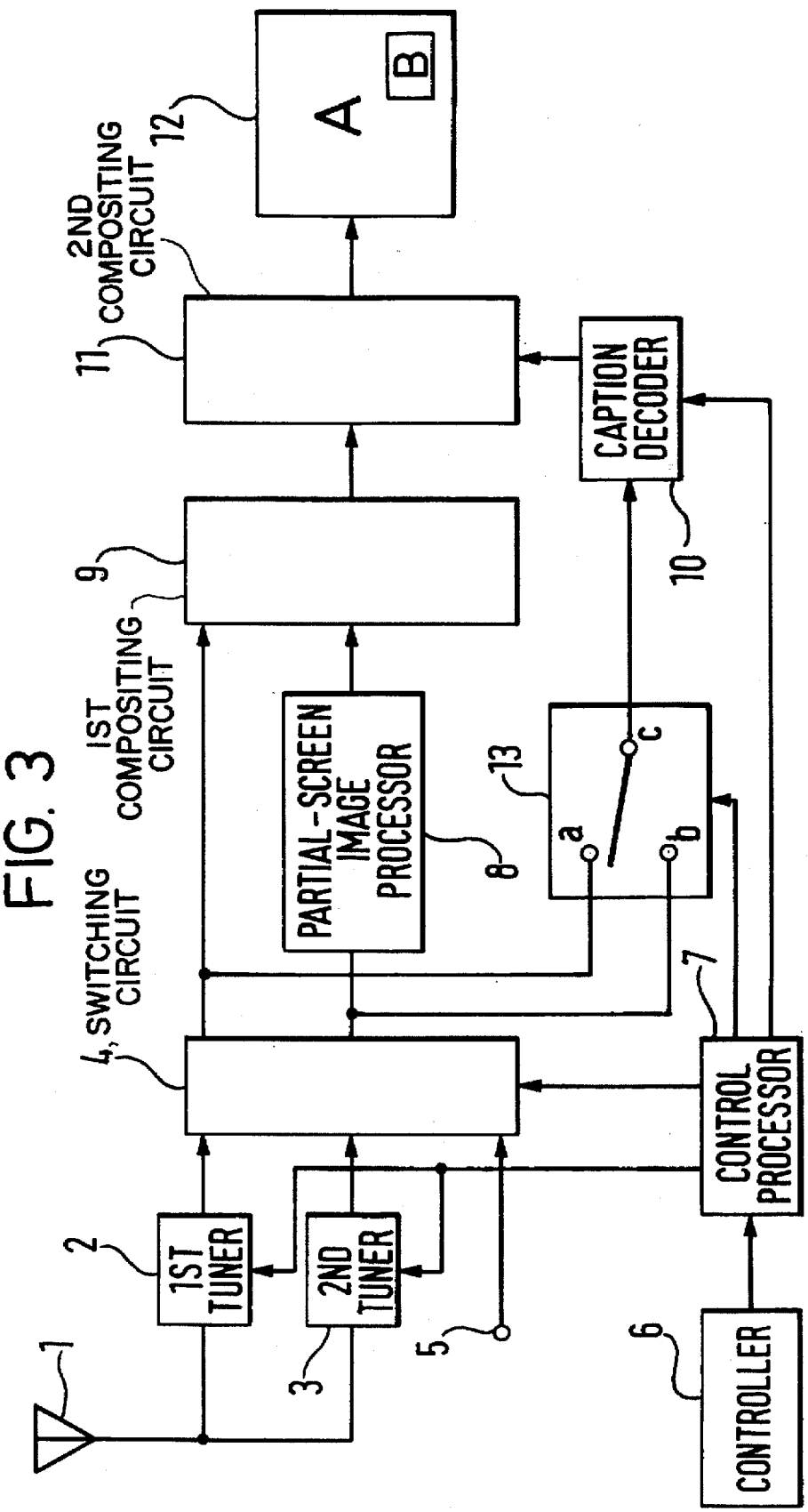

CHARACTER INFORMATION DISPLAY APPARATUS FOR A PARTIAL AND A FULL-SCREEN DISPLAY

FIELD OF THE INVENTION

The present invention relates to a character information display apparatus which displays character information by extracting it from a video signal wherein the character information such as caption information are multiplexed on another signal such as a conventional television signal.

BACKGROUND OF THE INVENTION

There are various systems for transmitting character information or graphic information by multiplexing with the vertical retrace lines of video signals such as television signals. For example, the Japanese teletext system, the English teletext system extended for an international specification, and the United States closed-caption system are known.

In the United States closed-caption system, for instance, a binarization signal consisting of caption information is multiplexed with an image signal in its 21 vertical retrace lines at a transmitter section. The binarization signal is then extracted from the caption signal by a slice process for the caption signal at a receiver section. The binarization signal is thus decoded. The caption signal is comprised of a clock run-in signal added at the head of the caption signal for synchronizing the decoding operation of the binarization signal, a start bit following the clock run-in signal, and a character code following the start bit.

A closed-caption decoder (hereinafter simply referred to as caption decoder) is required for decoding a multiplexed caption signal. Since September, 1993, U.S. law requires television receivers with displays larger than or equal to 13-inches to be equipped with caption decoders.

A television viewer could not listen to the sound associated with a partial-screen image superimposed on a full-screen image in a conventional multi-image display television receiver, such as one capable of displaying a picture-in-picture (PIP) screen image or a picture-out-picture (POP) screen image.

Accordingly, such a television receiver must be equipped with a terminal for an earphone or a headphone through which the sound associated with the partial-screen image is provided for listeners. A large television receiver, such as a projection type television receiver, usually requires a wireless system for wireless transmission to headphone receivers of sound associated with the partial-screen image, as occasion demands.

Such a conventional system, as described above, would be acceptable for a plurality of viewers to individually watch a full-screen image or any partial-screen image of their preference. However, it is not acceptable when an individual desires to listen to a sound associated with a partial-screen image as well as a sound associated with a full-screen image. When he is wearing a headphone to listen to the sound associated with the partial-screen image, he will find it difficult to listen to the sound associated with the full-screen image.

On the other hand, in the conventional multi-image display type television receiver equipped with the caption decoder as described above, the closed-caption function capable of displaying captions is dedicated to the full-screen image. Thus, when a viewer wishes to watch closed-caption information associated with the partial-screen image, he must exchange the full-screen image with the partial-screen image.

FIG. 1 shows a construction of a conventional PIP capable television receiver equipped with a caption decoder.

In FIG. 1, television signals input through an antenna 1 are distributed to a first tuner 2 and a second tuner 3. The first and second tuners 2, 3 perform tuning and video detection so as to output a video signal for the full-screen image and another video signal for the partial-screen image, respectively. A switching circuit 4 is supplied with a video signal through an external input terminal 5 as well as the video signals from the first and second tuners 2, 3. The switching circuit 4 is capable of selectively outputting one or two of the three video signals. Two of the signals are output from switching circuit 4 as a first video signal for the full-screen image and a second video signal for the partial-screen image. The external input provides a video signal from a recording and/or reproducing apparatus, such as a video tape recorder (VTR), a laser disc (LD) and the like.

Under the control of a controller 6, such as a remote controller, the switching circuit 4 changes the full-screen image signal and the partial-screen image signal, turns ON or OFF the display of the partial-screen image, and a turns ON or OFF the mute of sound associated with the full-screen image by a control signal output from a control processor 7 such as a microcomputer. In the controller 6 several keys are laid-out, such as a key for selecting a station, an ON/OFF key for turning the display of the partial-screen image (e.g., PIP image) ON or OFF, a full-screen image source changeover key, a partial-screen image source changeover key, a full-screen image and partial-screen image changeover key, an ON/OFF key for the caption display, a volume control key, a sound muting key and the like.

A partial-screen image signal from the switching circuit 4 is supplied to a first compositing circuit 9 via a partial-screen image signal processor 8 for performing image compressions in the horizontal and/or vertical direction. A first compositing circuit 9 includes, for example, switch circuits, and composites the partial-screen image signal from the partial-screen image signal processor 8 with the full-screen image signal from the switching circuit 4.

On the other hand, the full-screen image signal from the switching circuit 4 is also input to a caption decoder 10, so that the caption information can be extracted from the vertical retrace lines of the full-screen image signal and then demodulated. The demodulated caption information is then supplied to a second compositing circuit 11. The second compositing circuit 11 includes, for example, switch circuits, and composites the caption information from the caption decoder 10 with the first composite signal of the full-screen image signal and the partial-screen image signal from the first compositing circuit 9. Thus, the output, i,e, a second composite signal from the second compositing circuit 11 is supplied to a display device 12, such as a cathode ray tube (CRT).

The controlling circuit 7 controls tuning for the first tuner 2 and the second tuner 3, and also controls the switching circuit 4, the ON/OFF control for the caption decoder 10, a sound muting control and the like, under the control of the controller 6.

In the conventional arrangement as described above, the caption decoder 10 extracts the caption information from the full-screen image signal supplied from the switching circuit 4. When a viewer wishes to watch the caption information through the partial-screen image, the conventional apparatus must confirm the caption information after displaying the full-screen image by interchanging the full-screen image with the partial-screen image, because its caption display capability is limited to the full-screen image. Accordingly, the conventional apparatus has a drawback in that it must interchange the full-screen image with the partial-screen image when it is necessary to use the caption display for confirming the sound associated with the partial-screen image.

Furthermore, the conventional television receiver equipped with the caption decoder has a problem such that a television program becomes difficult to follow due to the loss of sound when a sound muting operation has been carried out when the viewer has a telephone call and the like, during a time when a caption is not displayed.

As described above, the conventional character information display apparatus has a problem such that viewers can not directly listen to the sound associated with the partial-screen image. When using a headphone, it is also impossible for him to listen to or confirm, by himself, both the sounds associated with the full-screen image and the partial-screen image. When he wishes to listen to the sound associated with the partial-screen image by using the caption display function, he must interchange the full-screen image and the partial-screen image. Furthermore, the conventional character information display apparatus has a problem such that a viewer cannot clearly understand speech while the muting of sound is carried out when the caption is not displayed.

SUMMARY OF THE INVENTION

It is, therefore, an object of the present invention to provide a character information display apparatus which is able to eliminate the drawbacks in the conventional apparatus. It is also an object of the present invention to provide a character information display apparatus which is able to automatically display caption information of the partial-screen image superimposed on the full-screen image during the muting of sound in order to allow a viewer to understand speech and the like.

The character information display apparatus according to a first aspect of the present invention includes, a first generator for generating a first video signal for a full-screen image including character information;

a second generator for generating a second video signal for a partial-screen image including character information;

a change-over switch for exchanging the first video signal for the full-screen image from the first generator with the second video signal for the partial-screen image from the second generator;

a demodulator for demodulating the character information extracted from the first video signal for the full-screen image or the second video signal for the partial-screen image output from the change-over switch;

a partial-screen image processor for compressing the second video signal from the second generator in a horizontal direction and/or a vertical direction;

a first compositing circuit for compositing the first video signal for the full-screen image from the first generator and the compressed video signal for the partial-screen image from the partial-screen image processor;

a second compositing circuit for compositing signals from the first composite image and a character signal from the demodulator;

a display device for displaying signals from the second compositing circuit;

a controller provided with a key for turning ON or OFF the display of the character information; and a control processor for controlling the change-over switch under the control of the controller and for displaying the character information of the full-screen image or the partial-screen image superimposed on the full-screen image.

The character information display apparatus according to a second aspect of the present invention includes.

a first generator for generating a first video signal for a full-screen image including character information;

a second generator for generating a second video signal for a partial-screen image including character information;

a change-over switch for exchanging the first video signal for the full-screen image from the first generator with the second video signal for the partial-screen image from the second generator;

a demodulator for demodulating the character information extracted from the first video signal for the full-screen image or the second video signal for the partial-screen image output from the change-over switch;

a partial-screen image processor for compressing the second video signal for the partial-screen image from the second generator in the horizontal direction and/or the vertical direction;

a first compositing circuit for compositing the first video signal for the full-screen image from the first generator and the compressed video signal for the partial-screen image from the partial-screen image processor;

a second compositing circuit for compositing signals from the first composite image and a character signal from the demodulator;

a display device for displaying signals from the second compositing circuit;

a controller provided with a first key for turning ON or OFF the display of the partial-screen image and a second key for turning ON or OFF the display of the character information;

a control processor for controlling the second generator, the change-over switch and the demodulator under the control of the controller, and further controlling a turning ON or OFF the display of the character information associated with the full-screen image whenever the second key is pressed and the first key is OFF and the partial-screen image is not displayed, and also operating a cyclic operation of a turning ON the display of the character information associated with the full-screen image, the display of the character information associated with the partial-screen image and a turning OFF the display of the character information whenever the second key is pressed and the first key is ON and the partial-screen image is displayed.

The character information display apparatus according to a third aspect of the present invention includes:

a first generator for generating a first video signal for a full-screen image including a character information:

a second generator for generating a second video signal for a partial-screen image including a character information;

a change-over switch for exchanging the first video signal for the full-screen image from the first generator with the second video signal for the partial-screen image from the second generator;

a demodulator for demodulating the character information extracted from the first video signal for the full-screen image or the second video signal for the partial-screen image output from the change-over switch;

a partial-screen image processor for compressing the partial-screen image video signal from the second generator in a horizontal or a vertical direction;

a first compositing circuit for compositing the first video signal for the full-screen image from the first generator and the compressed video signal for partial-screen image from the partial-screen image processor;

a second compositing circuit for compositing signals from the first composite image and a character signal from the demodulator;

a display device for displaying signals from the second compositing circuit;

a controller provided with a first key for turning ON or OFF the display of the partial-screen image, a second key for turning ON or OFF the display of the character information, and a third key for turning ON or OFF sound muting; and a control processor for controlling the first and the second generator under the control of the controller, the change-over switch, and the demodulator, and further controlling the turning ON or OFF of the display of the character information associated with the full-screen image whenever the second key is pressed and the first key is OFF and a partial-screen image is not displayed, and causing a cyclic operation of a turning ON the display of the character information associated with the full-screen image, the display of the character information associated with the partial-screen image and a turning OFF the display of the character information whenever the second key is pressed and the first key is ON and the partial-screen image is displayed, and further a turning ON or OFF the character information associated with a full-screen image simultaneously with the turning ON or OFF a mute of sound whenever the third key is pressed.

In the character information display apparatus according to the first aspect of the present invention, since the character information display apparatus having the change-over switch which selects one video signal for the full-screen image and one for the partial-screen image and inputs it to the demodulator at the first step of the demodulator, it is possible to control the change-over switch by the control processor and to display the character information of the full-screen image or the partial-screen image superimposed on the full-screen image under the control of the controller.

In the character information display apparatus according to the second aspect of the present invention, since the control processor controls the change-over switch and the demodulator under the control of the controller, it turns ON or OFF the display of the character information associated with the full-screen image in response to the ON operation of the character information key when the partial-screen image is displayed. The character information display apparatus also performs a cyclic operation as follows; the display of the character information associated with the full-screen image→the display of the character information associated with the partial-screen image→turning OFF the display of the character information→the display of the character information of the full-screen image→ .... Accordingly, it is able to improve the operability of displaying the character information.

In the character information display apparatus according to the third aspect of the present invention. Sound muting is carried out by pressing the sound muting key, for example, when a telephone rings while a viewer is watching television. The character information display apparatus never fails to follow the full-screen image information, even if the sound is muted, because of the display of character information of the full-screen image superimposed on the full-screen image.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a block diagram showing one embodiment of the character information display apparatus according to the present invention;

DESCRIPTION OF THE PREFERRED EMBODIMENTS

Referring now to the attached drawings, a preferred embodiment of the character information display apparatus according to the present invention will be described hereinafter.

Figure 1:
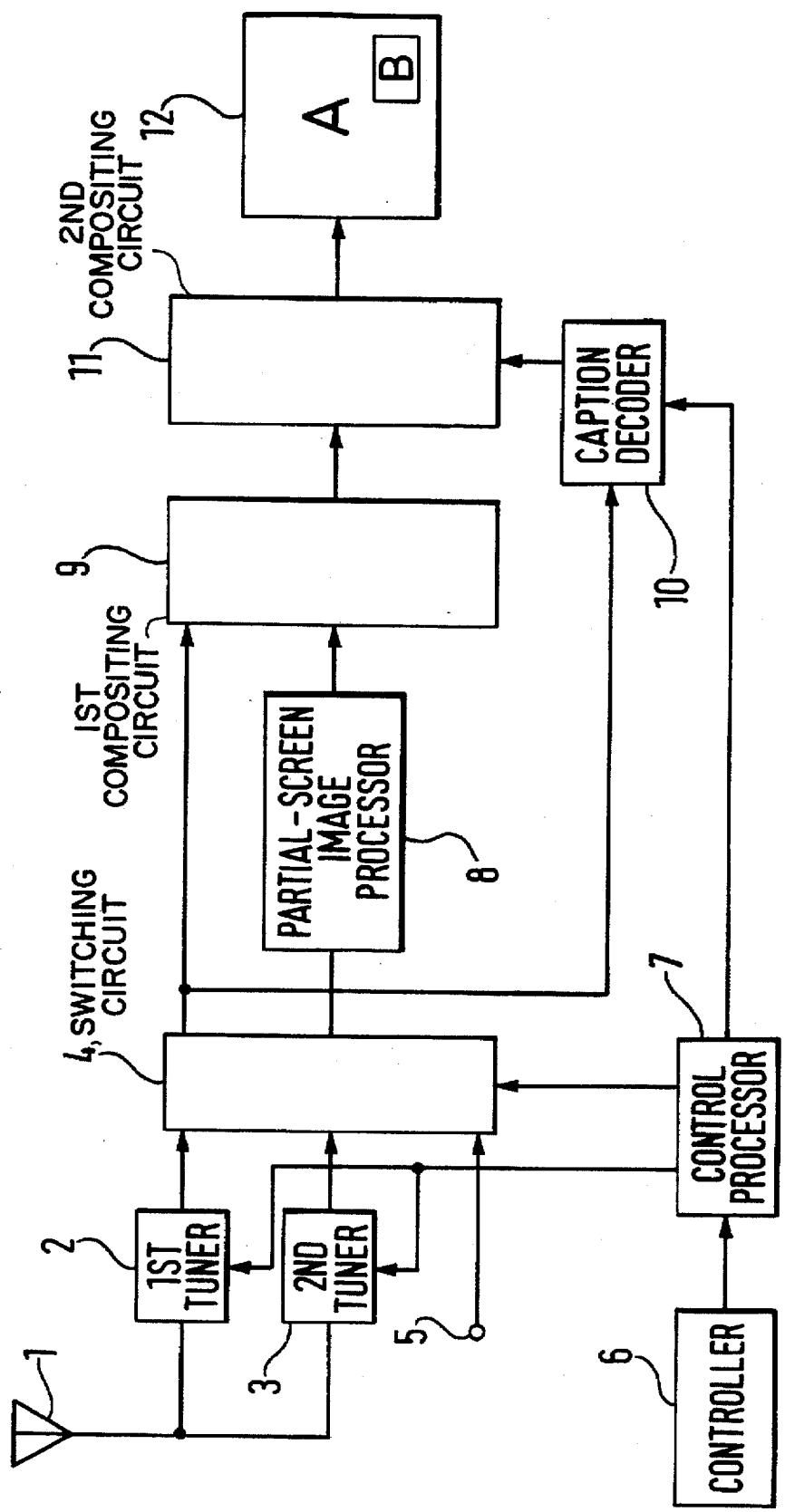
FIG. 1 is a block diagram showing a conventional character information display apparatus.
Figure 2:
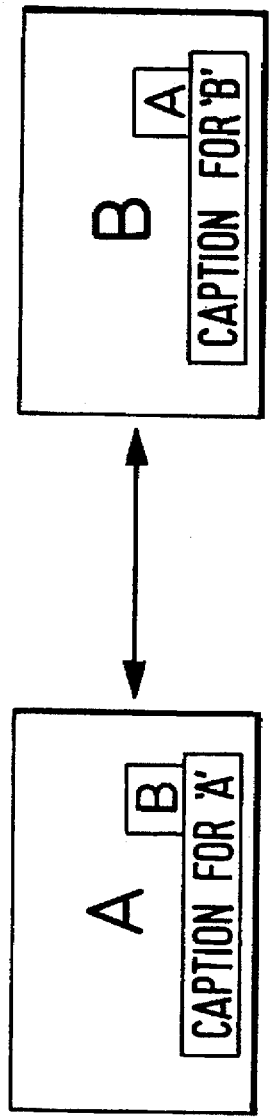
FIG. 2 is a diagram explaining problems in the conventional character information display apparatus, for example, to display the character information corresponding to the partial-screen display, it is necessary to exchange the video signal for the full-screen image with the video signal for the partial-screen image.

FIG. 3 is a block diagram showing the embodiment of the character information display apparatus according to the present invention FIG. 3 shows a construction of a PIP capable television receiver equipped with a caption decoder, which corresponds to the conventional apparatus, as shown in FIG. 1. Thus in FIG. 3 the same components as shown in FIG. 1 are assigned with the same reference numerals. Television signals containing caption information input through an antenna 1 are distributed to a first tuner 2 and a second tuner 3. The first and second tuners 2, 3 perform tuning and video detection. Thus the first tuner outputs a first video signal containing the caption information for displaying a full-screen image, while the second tuner 3 outputs a second video signal containing also the caption information for displaying a partial-screen image. A switching circuit 4 is also supplied with still another video signal through an external input terminal 5, as well as the video signals from the first and second tuners 2, 3. The switching circuit 4 is capable of selectively outputting one or two of the three video signals. Then two of the signals are output as a first video signal for the full-screen image and a second video signal for the partial-screen image from the switching circuit 4. The external input is provided with a video signal applied from a recording and/or reproducing apparatus such as a video tape recorder (VTR), a laser disc (LD) and the like.

Under the control of a controller 6 such as a remote controller, the switching circuit 4 performs the changeover of the full-screen image signal and the partial-screen image signal, a turning ON or OFF of the display of the partial-screen a image, a turning ON or OFF of the sound muting associated with the full-screen image by a control signal output from a control processor 7, such as a microcomputer. In the controller 6, there are laid-out several keys such as a key for selecting a station, an ON/OFF key for turning ON or OFF the display of the partial-screen image (e.g., PIP image), a full-screen image source changeover key, a partial-screen image source changeover key, a full-screen image and partial: screen image changeover key, an ON/OFF key for caption display, a volume control key, a sound muting key and the like.

A partial-screen image signal from the switch 4 is supplied to a first compositing circuit 9 via a partial-screen image signal processor 8 for performing image compressions in the horizontal and/or vertical direction. A first compositing circuit 9 includes, for example, switch circuits, and composites the partial-screen image signal from the partial-screen image signal processor 8 with the full-screen image signal from the switching circuit 4.

On the other hand, the full-screen image signal and the partial-screen image signal from the switching circuit 4 are supplied to input terminals a, b of a switch 13, respectively. The switch 13 then selectively outputs one of the signals to a caption decoder 10 through its output terminal c under the control of the control processor 7. The caption decoder 10 extracts the caption information from the vertical retrace lines of the full-screen image signal and then demodulates the caption information. The demodulated caption information is supplied to a second compositing circuit 11. The second compositing circuit 11 includes, for example, switch circuits, and composites the caption information from the caption decoder 10 with the first composite signal of the full-screen image signal and the partial-screen image signal from the first compositing circuit 9. Thus the output, i,e, a second composite signal from the second compositing circuit 11 is supplied to a display device 12 such as a cathode ray tube (CRT). "A" on the display device shown in all figures represents the full-screen image and "B" represents the partial-screen image.

The controlling circuit 7 performs tuning control for the first tuner 2 and the second tuner 3, control for the switching circuit 4, an ON/OFF control for the caption decoder 10, a sound muting control and the like, as well as control of the switch 13, under the control of the controller 6.

In the above construction, the switch 13 is coupled to the input of the caption decoder 10 for selectively transmitting one of the full-screen image signal on its input terminal a and the partial-screen image signal on its input terminal b to the caption decoder 10, under the ON/OFF control of a caption key on the controller 6. Thus when the switch 13 selects the input terminal a, the caption information in the full-screen image signal is displayed on the full-screen image. While when the switch 13 selects the input terminal b, the caption information in the partial-screen image signal is displayed on the full-screen image.

The control processor 7 controls the switching circuit 4, the switch 13, and the caption decoder 10 under the control of a partial-screen image display (PIP) key and the caption key on the controller 6. According to the control operations of the control processor 7, the character information display apparatus of the television receiver performs operations as follows.

Figure 4A:
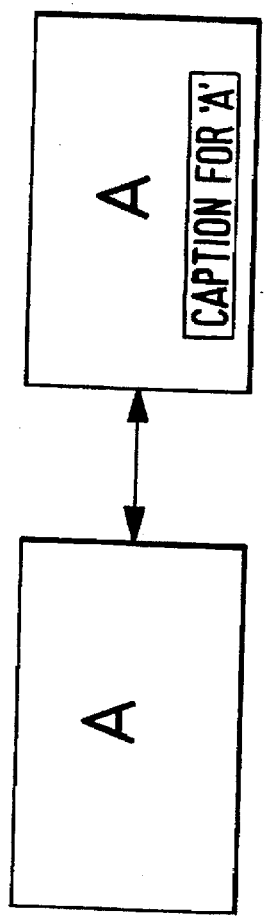
FIG. 4 is a diagram for explaining the operation of the character information display apparatus shown in FIG. 3.
Figure 4B:
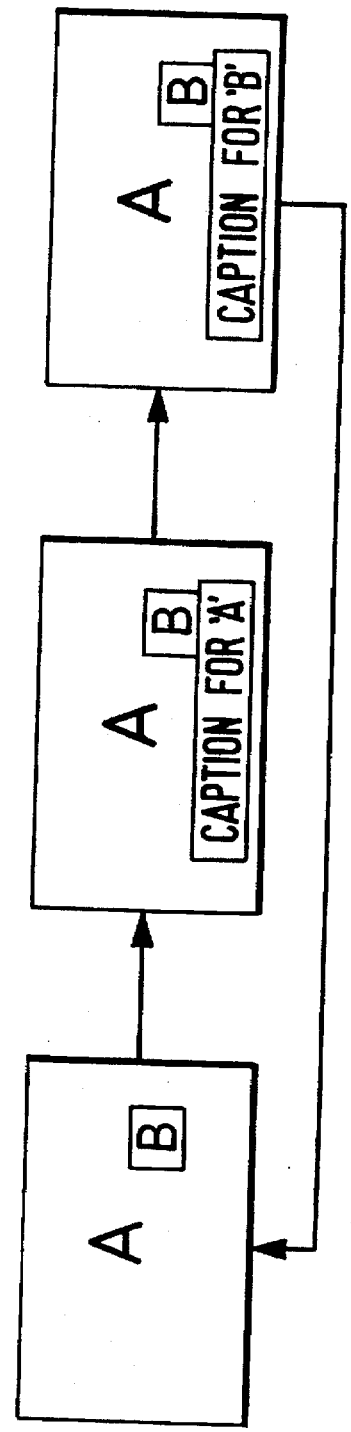

When the switching circuit 4 causes the partial-screen image signal not to be output in response to turning OFF the partial-screen image display (PIP) key (i.e., the partial-screen image is not displayed), the caption information in the full-screen image is turned ON or OFF, as shown in FIG. 4(a), since the switch 13 is changed in response to the operation of the caption key on the controller 6. When the partial-screen image signal is selected at the switching circuit 4 in response to the ON operation of the partial-screen image display (PIP) key (i.e., the display of the partial-screen image is intended), it performs a cyclic operation as follows; the display of the caption associated with the full-screen image→the display of the caption associated with the partial-screen image→turning OFF the display of the caption→the display of the caption associated with the full-screen image . . . , as shown in FIG. 4(b), since the switch 13 is changed so as to control the output of the caption decoder 10 in response to the operation of the caption key on the controller 6.

The control processor 7 also controls the switching circuit 4, the switch 13, and the caption decoder 10 under the control of a sound muting key on the controller 6. According to the control operations of the control processor 7, the character information display apparatus of the television receiver performs operations as follows.

Figure 5:
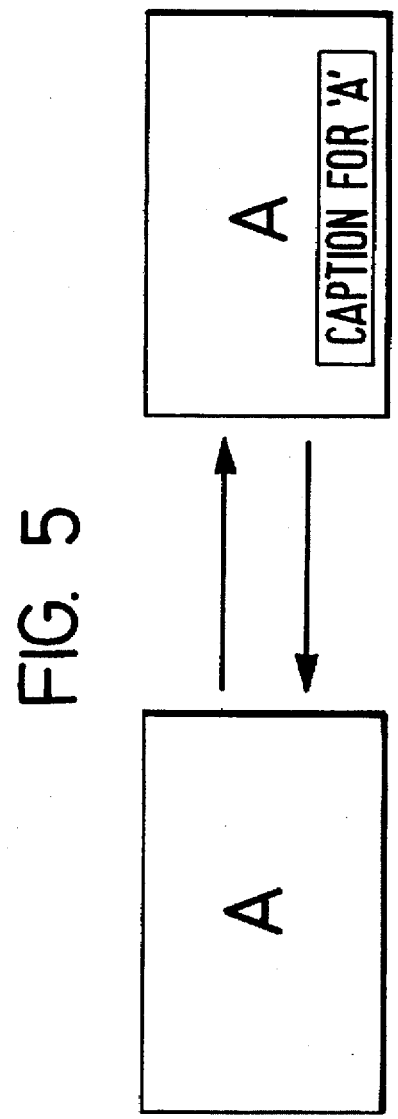
FIG. 5 is a diagram explaining the operation of the character information display apparatus shown in FIG. 3.

When the sound muting key is pressed while the full-screen image is displayed (both the full-screen image and the partial-screen image are displayed and the caption information in the partial-screen image signal is displayed on the full-screen image), sound muting associated with the full-screen image is carried out at the switching circuit 4 (turning ON the mute), as shown in FIG. 5. The left side of FIG. 5 shows the full-screen image with muting turned off. The right side of FIG. 5 shows the full-screen image after muting has been turned on. At the same time, the switch 13 is changed to the input terminal a for receiving the full-screen image signal, thus the caption information associated with the full-screen image is displayed. When the sound muting key is pressed again, sound muting is turned OFF at the switching circuit 4 (a sound is produced), and at the same time the output of the caption decoder is so controlled to turn OFF the display of the caption information (the caption information disappears). The caption information, as before, can be activated again by the operation of the sound muting key on the controller, regardless of whether the caption information is associated with the full-screen image or the partial-screen image.

The present invention is not limited to the television receiver equipped with the United States system closed-caption decoder. For example, the present invention can be applied to the television receiver equipped with the Japanese system sound multiplex broadcast decoder.

As described above, the present invention can provide an extremely preferable character information display apparatus which displays character information (e.g., captions) of the partial-screen image while the viewer listens to the sound associated with the full-screen image. The present invention can also provide the character information display apparatus on which viewers can enjoy both the full-screen image and the partial-screen image. On the other hand, the present invention can provide the character information display apparatus in which viewers can confirm captions representing speeches since the character information in the full-screen image signal is automatically displayed on the full-screen image when the sound associated with the full-screen image is muted.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a divisional application.

What is claimed is:

1. A character information display apparatus comprising:

first generator means for generating a first video signal for a full-screen image including character information;

second generator means for generating a second video signal for a partial-screen image including character information;

change-over means for exchanging said first video signal for said full-screen image from said first generator means with said second video signal for said partial-screen image from said second generator means;

demodulation means for demodulating said character information extracted from one of said first video signal for said full-screen image and said second video signal for said partial-screen image output from said change-over means;

partial-screen image processing means for compressing said second video signal for said partial-screen image from said second generator means in at least one of a horizontal direction and a vertical direction;

first compositing means for compositing said first video signal for said full-screen image from said first generator means and a compressed video signal for said partial-screen image from said partial-screen image processing means to form first composite signals for a first composite image;

second compositing means for compositing said first composite signals from said first composite image and a character signal from said demodulation means to form second composite signals for a second composite image;

display means for displaying said second composite signals from said second compositing means;

controller means provided with a first key for turning ON and OFF a display of said partial-screen image and a second key for turning ON and OFF a display of the character information;

control processor means for controlling said second generator means, said change-over means and said demodulation means under control of said controller means, and further for turning ON and OFF said display of said character information corresponding to said full-screen image when said second key is pressed and said first key is OFF and said partial-screen image is not displayed, and for controlling a cyclic operation to turn ON said display of said character information corresponding to said full-screen image, to turn on said display of said character information corresponding to said partial-screen image and to turn OFF said display of said character information when said second key is pressed and said first key is ON and said partial-screen image is displayed.

2. A character information display apparatus comprising:

first generator means for generating a first video signal for a full-screen image including a character information;

second generator means for generating a second video signal for a partial-screen image including a character information;

change-over means for exchanging said first video signal for said full-screen image from said first generator means with said second video signal for said partial-screen image from said second generator means;

demodulation means for demodulating said character information extracted from one of said first video signal for said full-screen image and said second video signal for said partial-screen image output from said change-over means;

partial-screen image processing means for compressing said partial-screen image video signal from said second generator means in at least one of a horizontal direction and a vertical direction;

first compositing means for compositing said first video signal for the full-screen image from said first generator means and a compressed video signal for said partial-screen image from said partial-screen image processing means to form first composite signals for a first composite image;

second compositing means for compositing said first composite signals from said first composite image and a character signal from said demodulation means to form second composite signals for a second composite image;

display means for displaying said second composite signals from said second compositing means;

controller means provided with a first key for turning ON and OFF a partial-screen image display, a second key for turning ON and OFF a display of said character information, and a third key for turning ON and OFF a mute of sound; and control processor means for controlling said first generator means and said second generator means under control of said controller means, said change-over means, and said demodulation means and further for turning ON and OFF said display of said character information corresponding to said full-screen image when said second key is pressed and said first key is OFF and said partial-screen image is not displayed, and for controlling a cyclic operation to turn ON said display of said character information corresponding to said full-screen image, to turn on said display of said character information corresponding to said partial-screen image and to turn OFF said display of said character information when said second key is pressed and said first key is ON and said partial-screen image is displayed, and for turning ON and OFF said character information corresponding to said full-screen image when said third key is pressed causing said mute of sound to turn ON and said mute of sound to turn OFF alternately.

3. A character information display apparatus as claimed in claim 1, wherein the character information includes a closed-caption signal.

4. A character information display apparatus as claimed in claim 2, wherein the character information includes a closed-caption signal.

5. A character information display apparatus according to claim 2, wherein:

said display of said character information corresponding to said full-screen image is turned ON when said third key is pressed causing said mute of sound to be turned ON and said display of said character information to be turned OFF when said third key is subsequently pressed causing said mute of sound to be turned OFF.

* * * * *